(12) United States Patent
Vion

(10) Patent No.: US 6,210,588 B1
(45) Date of Patent: *Apr. 3, 2001

(54) METHOD FOR THE PHYSICO-CHEMICAL TREATMENT OF EFFLUENTS IN PARTICULAR SURFACE WATER FOR CONSUMPTION

(75) Inventor: Patrick Vion, Houilles (FR)

(73) Assignee: Degremont, Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/355,030

(22) PCT Filed: Jan. 26, 1998

(86) PCT No.: PCT/FR98/00134

§ 371 Date: Jul. 22, 1999

§ 102(e) Date: Jul. 22, 1999

(87) PCT Pub. No.: WO98/32702

PCT Pub. Date: Jul. 30, 1998

(30) Foreign Application Priority Data

Jan. 27, 1997 (FR) .................................. 97 00846
Dec. 29, 1997 (FR) .................................. 97 16634

(51) Int. Cl.$^7$ ..................................... C02F 1/56
(52) U.S. Cl. ..................... 210/711; 210/713; 210/714; 210/727; 210/738
(58) Field of Search ............................. 210/710, 711, 210/713, 714, 715, 726, 727, 738

(56) References Cited

U.S. PATENT DOCUMENTS

| | | | | |
|---|---|---|---|---|
| 3,350,302 | * | 10/1967 | Demeter et al. | 210/711 |
| 3,377,274 | * | 4/1968 | Burke et al. | 210/727 |
| 4,309,291 | * | 1/1982 | Probstein et al. | 210/713 |
| 4,388,195 | * | 6/1983 | von Hagel et al. | 210/709 |
| 4,927,543 | * | 5/1990 | Bablon et al. | 210/711 |
| 4,997,573 | * | 3/1991 | Browne | 210/714 |
| 5,730,864 | * | 3/1998 | Delsalle et al. | 210/195.1 |
| 5,750,033 | * | 5/1998 | Ikeda et al. | 210/711 |
| 5,770,091 | * | 6/1998 | Binot et al. | 210/711 |
| 5,800,717 | * | 9/1998 | Ramsay et al. | 210/711 |
| 6,010,631 | * | 1/2000 | Delsalle et al. | 210/713 |

* cited by examiner

*Primary Examiner*—Peter A. Hruskoci
(74) *Attorney, Agent, or Firm*—Connolly Bove Lodge & Hutz

(57) ABSTRACT

Process for the physico-chemical treatment of effluent, especially of surface water intended for consumption, comprising the successive steps of coagulation, flocculation and settling, a contacting mass being introduced into the water coming from the coagulation step, and therefore during the flocculation step, and this contacting mass consisting of part of the densified sludge resulting from the settling step and recycled in the flocculation step, this process being characterized in that at least part of the polyelectrolyte ensuring flocculation is injected into a sludge-recirculation circuit.

38 Claims, 3 Drawing Sheets

METHOD FOR THE PHYSICO-CHEMICAL TREATMENT OF EFFLUENTS IN PARTICULAR SURFACE WATER FOR CONSUMPTION

FIELD OF THE INVENTION

The present invention relates to a process for the physico-chemical treatment of effluent, especially of surface water intended for consumption.

BACKGROUND OF THE INVENTION

It is known that the use of physico-chemical processes is common to most treatments applied to various types of water and that these treatments essentially consist of:

clarification of surface water for consumption or for industry;

clarification of municipal sewage, storm water or industrial waste water;

decarbonization;

removal of phosphates;

etc.

These types of physico-chemical treatments always comprise the following successive steps:

coagulation: a step of neutralization of the colloids using a metal salt, generally a trivalent iron or aluminum compound, in order to form a microflock. This coagulation step may be carried out in one or more steps;

flocculation: a step of agglomeration and growth of the microflock. This agglomeration step takes place by virtue of the addition of a polyelectrolyte (or polymer) downstream of the coagulation step;

settling: a step of separation of the flock from the interstitial water, causing the formation of sludge on the one hand, and-of clarified water on the other hand.

Over the last thirty years or so, the state of the art relating to such a physico-chemical treatment has evolved considerably as a result of the appearance of two technologies:

flocculation with a contacting mass, which has allowed the quality of the flocks to be improved, the volume of the reactors to be reduced and the clarification to be improved. This is because the microflocks of the coagulation have a greater chance of agglomerating and of growing as the reaction medium contains a high density of particles: the rate of flock formation is proportional to the number of free particles in the suspension;

lamellar settling, carried out by introducing inclined plates or tubes in the settling tanks. This technology has made it possible to reduce the size of the settling tanks by from 50 to 70%.

The current technological trend is towards improving the flocculation conditions, which are key in determining the quality of the treated water and in obtaining high settling velocities.

At the present time, modern settling tanks use two types of contacting masses in the flocculation reactor:

1. recirculated presettled sludge: an example of this technique is described in FR-A-2,553,082;
2. fine ballasts, such as microsand: an example of the use of this technique is described in FR-P-1,411,792 and in FR-A-2,627,704.

The present invention relates to improvements made to apparatus employing recirculated presettled sludge, these improvements being such that the apparatus, while still maintaining their specificities and their advantages, operate at much greater settling velocities.

Before describing the improvements, the advantages and disadvantages of this known technique, using a sludge contacting mas, will be explained.

FIG. 1 of the appended drawings shows diagrammatically a physico-chemical treatment plant employing this technique. This figure shows diagrammatically, at A, the coagulation reactor, at B, the flocculator and, at C, the settling tank. These are plants well known to those skilled in the art and, under these conditions, they will not be described.

Thus, as may be seen in this FIG. 1, the contacting mass in the flocculation reactor B consists of the recirculation of part of the sludge which has settled in C, this recycled part of the sludge being introduced into the flocculator B via the pipe 16 and the recirculating pump 18. The recirculated sludge volume represents between 0.5 and 4% of the treated volume. The recirculated sludge, the raw water and the polyelectrolyte are brought into contact with each other in a highly turbulent zone, the polymer, as may be seen in FIG. 1, generally being injected near the propeller 10 of the flocculator B. The excess, concentrated sludge is extracted and removed.

The advantages of this flocculation technique using recirculated presettled sludge as the contacting mass are the following:

1—the contacting mass is generated by the process, and is therefore available without any quantity limitation, depending on the requirements of the process;

2—in the flocculation reactor B, the mass of sludge due to the recirculation is very high compared to the suspended matter brought in by the raw water. As a result, the system is insensitive both to significant increases and significant decreases in the amount of suspended matter in the raw water;

3—the contacting mass presents a very high specific surface area or spatial occupation because of its expanded structure and its low relative density; by way of example, 1 gram of flocculated sludge in one liter (average concentration in the reactor) occupies, after settling for approximately 5 minutes, a volume equal to 100 ml. This very high specific surface area or spatial occupation considerably increases the probability of contact between the flocks and the very fine particles, coagulated colloids and micro-organisms, and therefore the probability of "trapping" this suspended matter very efficiently;

4—because of the continuous recirculation of ever-reflocculated sludge, the latter densifies. Thus, the extracted sludge is highly concentrated (two to ten times more concentrated than the sludge in most apparatuses);

5—this technique makes it possible to achieve relatively high treatment rates. Thus, when clarifying river water, the announced rates through the lamellar modules of the settling tank are between 10 and 25 $m^3/m^2 \cdot h$, which corresponds to settling velocities UD (the flow rate/raft area ratio of the settling tank) of 6 to 15 m/h. These velocities are in fact limited by the limiting mass flux (Fml) of the flocculated suspension expressed in kg of suspended matter flowing per $m^2$ of settling tank raft and per hour ($kg/m^2/h$).

The mass flux is the limiting factor which determines the limiting theoretical settling value Udl. This value is also related to the concentration CR of the sludge in the reactor B, expressed in $kg/m^3$:

$$Fml = CR \times Udl$$

i.e.: Udl=Fml/CR.

If the settling velocity UD applied to the settling tank C is equal to or greater than Udl, there is clogging. The lamellar settling tank is effective as a finisher, but it is incapable of retaining a sludge bed.

It is therefore necessary to check that the mass flux applied to the settling tank is less than Fml or that the settling velocity UD applied to the settling tank is less than Udl.

For example, in the case of river-water clarification, the limiting mass flux is generally less than or about 20 kg/m$^3$.h. The concentration CR required for good flocculation is approximately 1 kg/m$^3$. The limiting settling velocity Udl is then 20m/h, hence the velocity UD applied to the settling tank is less than 15 m/h for safety reasons;

6—often such apparatus are followed by a filtration system. This is the case with river-water clarification. The filtration is characterized by the quality of the filtered water and by the filtration cycle time (the period of operation after which the maximum caking of the filter is achieved, requiring the latter to be washed). In the case of settling tanks with sludge recirculation, the filtration cycle time is generally greater than 24 h.

In order to determine the ability of the clarified water to be filtered using correct filtration times, tests representative of the clarified-water filter-ability are carried out. Thus, one of the tests that can be used consists in measuring the time necessary to filter 250 cm$^3$ of clarified water on a 5 $\mu$m membrane under a vacuum of 8×10$^4$ Pa. The water will be more easily filtered in a shorter time. In the case of a settling tank operating with a settling velocity UD equal to 15 m/h, the filterability is approximately 30 seconds;

7—increasing the settling velocities UD is possible, but at the cost of increasing the dose of polyelectrolyte. However, an excess of polyelectrolyte reduces the filterability of clarified water (increase in the time of the test), which means, on a filter, surface clogging and therefore a reduction in the filtration cycle time.

The present invention aims to improve the technique explained above, for the purpose of increasing the settling velocities thereof, without affecting the filterability of the clarified water.

Consequently, the subject of the present invention is a process for the physico-chemical treatment of effluent, especially of surface water intended for consumption, The process includes the successive steps of coagulation, flocculation and settling. A contacting mass is introduced into the water coming from the coagulation step, and therefore during the flocculation step. This contacting mass consists of part of the densified sludge resulting from the settling step and recycled in the flocculation step. This process is characterized in that at least part of the polyelectrolyte ensuring flocculation is injected into the sludge-recirculation circuit.

It has been found that operating in this way has the unexpected and advantageous effect of increasing the limiting mass flux, the settling velocity, the filterability of the raw water and the concentration of the extracted sludge.

The process, forming the subject of this invention and such as defined above, may be implemented in a flocculation step using a ballast as the contacting mass.

It is known that, according to this technique, the contacting mass is obtained by adding, upstream of a flocculator, a fresh or recycled ballast after cleaning. The means making it possible to separate and regenerate the ballast which is to be recycled in the flocculator are means well known to those skilled in the art and, under these conditions, they will not be described.

When implementing this technique, the ballast generally consists of sand and the continuously extracted materials amount to approximately 5% of the volume of water treated by the settling tank; these extracted materials, laden with sludge coating the microsand, must be treated so as to regenerate the sand; the cleaned sand is subsequently reinjected upstream of the flocculator, at the front of the plant. The residue generated by this sand-ballast cleaning operation represents the excess sludge.

It will be noted that the existing ballast-type apparatus described in the literature, and especially in FR-P-1,411,792 and in FR-A-2,627,704, include a ballast-recycling step for obvious running-cost reasons. Moreover, in all the documents describing this technology it is specified that the ballast is always "cleaned", i.e. regenerated. This is because, the ballast, "coated" with the polymer, must have the maximum area of adhesion for the precipitation flocks produced chemically during coagulation. An effective physical cleaning is therefore indispensable for maximizing the binding area available.

The ballast is often sand, generally having a diameter of between 50 $\mu$m and 150 $\mu$m, usually called microsand.

The publication Journal Water SRT-AQUA, Vol. 41, No. 1, pp. 18–27, 1992 describes a curve relating the turbidity of the water produced to the diameter of the ballast particles, which demonstrates that this process becomes effective when the sand particles do not exceed 150 $\mu$m, the results being even better with values of the order of 50 to 100 $\mu$m.

It should be pointed out that the advantage of this technique of flocculation using a contacting mass consisting of a fine ballast essentially resides in the settling velocity, which may be from 20% to 200% greater than the velocities obtained by the flocculation processes using a contacting mass consisting of recirculated presettled sludge. Thus, when clarifying river water, the announced velocities through the lamellar modules are between 25 and 50 m$^3$/m$^2$.h while the equipment implementing the flocculation process using sludge as the contacting mass is limited to velocities of between approximately 15 and 30 m$^3$/m$^2$.h.

The essential drawbacks of this technique mainly stem from the fact that the ballast must provide two different functions:

accelerated flocculation, by virtue of the use of a contacting mass having a high specific surface area (or spatial occupation);

increase in the settling velocities, resulting from the addition of ballast to the flock.

These limitations or drawbacks can be imputed to the following characteristics:

for equivalent contacting mass (by weight), the ballast offers a contacting surface area or percentage of spatial occupation which is much less than the sludge. By way of example:

in the case of "flocculation with sludge", the concentration in the reactor is approximately 1 g/l and the volume occupied by the sludge after five minutes of settling is approximately 10% of the initial volume;

in the case of "flocculation with ballast (for example sand)", the ballast concentration in the reactor should reach at least 5 g/l, while the volume occupied by sludge after five minutes of settling is only approximately 1% of the initial volume;

increasing the amount of ballast, desirable for obtaining a high contacting mass (and not for obtaining a high settling velocity), leads to an increase in the volume of sludge recirculated to the extracted-sludge treatment system, which treatment consists in separating the sludge from the sand so as to regenerate the latter. This operation is generally carried out by hydrocyclones supplied at high pressures, which operation therefore becomes very expensive from an energy consumption standpoint. In fact, and so as to limit the running costs, the volume of recirculated sludge is intentionally limited to between 5 and 10% of the volume treated and the ballast concentration in the reactor does not exceed 5 to 10 g/l: quite obviously this choice is incompatible with the possibility of optimizing the flocculation.

Various techniques are aimed at compensating for the deficit in the contacting mass resulting from the operating conditions described above, such as:

the use of additional flocculation energy (figures ranging up to 100 times the conventional flocculation energy may be mentioned) or the use of even finer ballast particles, increasing the specific surface area (for example, particles having a diameter of between 10 and 50 $\mu$m), is not conceivable, on the one hand, for energy cost reasons and, on the other hand, for reasons of difficulty in settling and in sand-flock separation.

In summary, the performance characteristics of flocculation with ballast are limited by three factors:

the system is sensitive to sudden pollution caused by lack of availability of binding sites on the ballast (the contacting mass is limited to a maximum of 5–10 g/l);

the system has a lower performance with regard to so-called "sensitive" pollutants (helminth eggs, microorganisms, micro-particles, traces of complex organic compounds, pesticides etc.);

the low concentration of extracted sludge, resulting from the need to clean the ballast as fully as possible—this concentration is at least 10 times lower than that measured on apparatus using a sludge contacting mass—and frequently involving the installation of a complementary unit, downstream of the settling tank, for thickening the extracted sludge.

BRIEF DESCRIPTION OF THE INVENTION

The present invention aims to combine the process as defined above with ballast-type flocculation, while at the same time eliminating the drawbacks and limitations of the conventional processes mentioned above, this process making it possible to obtain high-velocity settling.

Consequently, this invention relates to a process for the physico-chemical treatment of effluent, especially of surface water intended for consumption, comprising the successive steps of coagulation, flocculation and settling, characterized in that, during the flocculation step, a ballast is introduced into the sludge, the function of which is to make the sludge heavier. The contacting mass used during this flocculation step consists of part of the densified sludge resulting from the settling step and continuously recycled in the flocculation step, without a washing operation. At least part of the polyelectrolyte ensuring flocculation is injected into the sludge-recirculation circuit.

Thus, according to the invention, a ballast is employed but it is used differently from that in the so-called "flocculation with ballast" process described above. According to the invention, the ballast has only one role, that of ladening, and the flocculation function of the contacting mass is performed just by the recirculated sludge. The ballast no longer constitutes a surface for adhesion, offered to the particles, but simply constitutes a ladening mass which becomes incorporated in the sludge recirculated to the flocculation reactor, this recirculated sludge constituting the contacting mass.

According to one characteristic of the present invention, the ballast consists of a material having a particle size of between 50 and 500 $\mu$m, preferably between 100 and 300 $\mu$m.

According to a preferred embodiment of the invention, this ballast is a dense inorganic material (actual particle density between 2 and 8 g/ml), especially sand, garnet or magnetite.

According to the present invention, the excess, densified sludge, which is not recycled, may be discharged without treatment or else may be treated so as to recover the ballast, this treatment not including a thorough cleaning of the ballast separated from the sludge. In the case of discharge without treatment, the densified sludge exhibits superior settling capability.

According to the invention, the ballast is preferably recovered by gravity sedimentation, either inside or outside the settling tank, the recovered ballast then being recycled in the flocculation step.

Other features and advantages of the present invention will emerge from the description given below with reference to the appended drawings which illustrate one method of implementing it, this being devoid of any limiting character. In the drawings:

DETAILED DESCRIPTION

Figure 1:
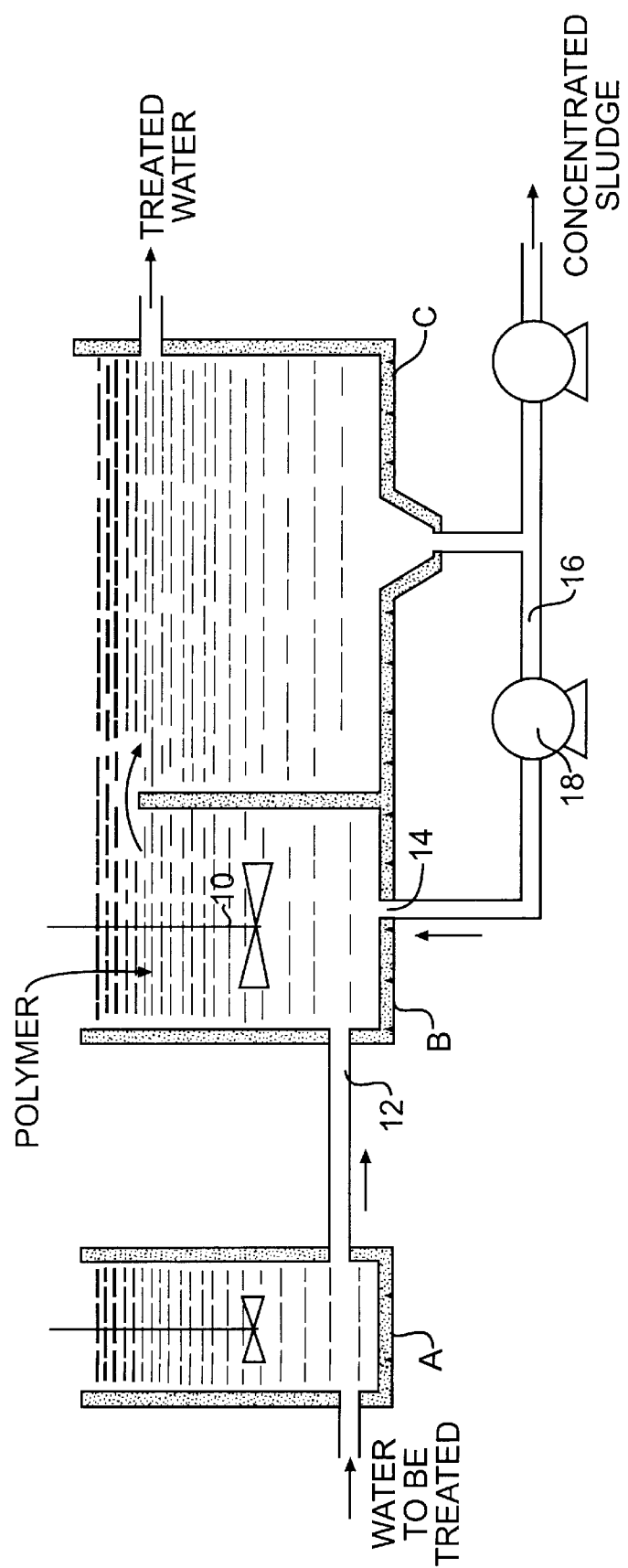
FIG. 1 is a diagrammatic view illustrating the principle of the known physico-chemical treatment process described above, in which the contacting mass used during the flocculation step consists of recirculated presettled sludge.
Figure 2:
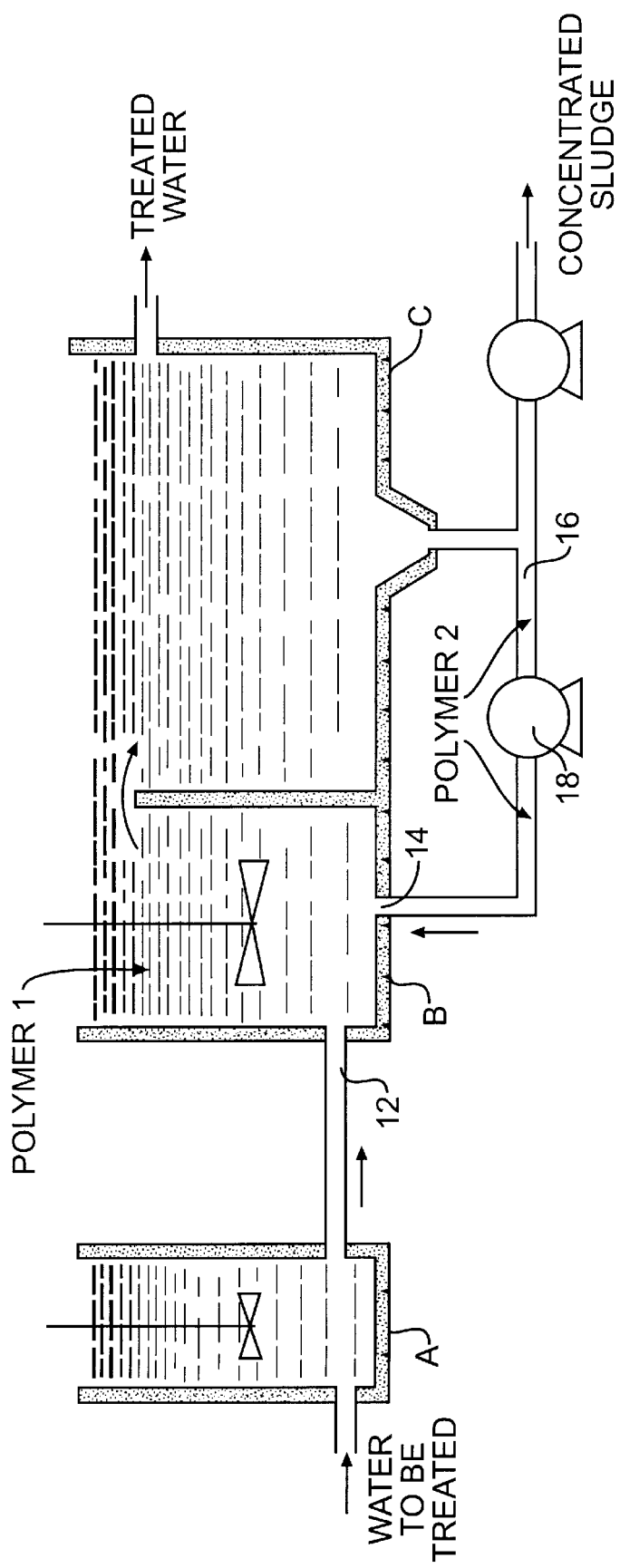
FIG. 2 is a diagram, similar to FIG. 1, illustrating the principle of the process which forms the subject of the present invention, with double polyelectrolyte injection.

As seen in FIG. 2, the contacting mass in the flocculator B, as in the known process illustrated in FIG. 1, consists of a continuous recirculation of part of the densified sludge, after settling and thickening in the settling tank C. That part of the sludge thus recycled is recirculated to the flocculator B by means of the recirculation pipe 16, which emerges at 14 in the flocculator, and of the pump 18. According to a preferred method of implementation, the recirculated volume represents between 0.5% and 4% of the treated volume.

According to the present invention (FIG. 2), at least part (polymer 2) of the polyelectrolyte necessary for the flocculation is injected into the sludge-recirculation circuit 16. The possibly remaining part of the polyelectrolyte (polymer 1) is injected into the flocculation reactor B. As may be seen in FIG. 2, this injection of at least part of the polyelectrolyte into the recirculated sludge may be performed upstream or downstream of the recirculating pump 18. Generally, this injection will be performed upstream of the pump 18 so that the recycled sludge/polyelectrolytes mixture benefits from the churning produced by the pump.

As a variant, that part of the polyelectrolyte injected into the recycled sludge may be mixed with the latter in a specific stirred reactor placed in the recirculation pipe 16.

According to the present invention, the primary injection of polyelectrolyte (polymer 1) may take place in the flocculation reactor B, near the propeller 10 of the latter, as illustrated in FIG. 2, but it may also be carried out in the pipe 12 for bringing the water to be treated into the flocculator (stirred region), upstream or downstream of the point 14 where the recirculated sludge enters via the pipe 16.

According to the invention, the ratio between the dose of polyelectrolyte injected into the flocculation reactor B (primary injection) and the dose injected into the sludge-recirculation circuit 16 (secondary injection) may vary and be optimized. The proportion of polymer injected into the sludge recirculation may vary from 10% to 100% of the total flux of polymer, 10% being the dose of polymer necessary to obtain a significant increase in the mass flux (greater than 10%). It is possible according to the invention to inject 100% of the polymer into the sludge-recirculation circuit. In this case, the mass fluxes are even greater (100 to 200 kg/m$^3$.h.), but the quality of the water is slightly inferior. This is because, in this case, there is no longer enough free polymer to achieve the bonding between the dense recirculated sludge and the microflocks coming from the coagulation of the raw water.

In practice, depending on whether the desired objective is a high settling velocity UD (compactness of the plant) or a quality treated water, the proportion of polymer injected into the sludge-recirculation circuit with respect to the entire amount of polymer injected in the flocculation step, will vary from 10% to 100%, with the optimum generally lying between 20 and 70%.

According to the present invention, a polymer different from that injected into the flocculation reactor B may be injected into the recirculated sludge. Thus, for example, it is possible to inject an anionic polymer into the flocculation reactor B and a cationic polymer into the recirculated sludge.

According to the present invention, the recirculated sludge may be injected directly into the flocculator B, as illustrated in FIG. 2, or else into the pipe 12 which links the coagulator A with the flocculator B.

The process which forms the subject of the present invention may be applied to any type of water treatment, clarification of water for consumption or for industry, treatment of industrial or municipal water (primary or tertiary, etc.).

Trials have been carried out on the same trial pilot plant equipped with a coagulator A, a flocculator B and a settling tank C, the settling area SD of which was equal to 2 m$^2$, and a sludge-recirculation circuit 16 having a recirculating pump 18 of suitable output. The capacity of this trial pilot plant was approximately 100 m$^3$/h.

Two series of trials have thus been carried out on surface water. The dose of polyelectrolyte was the same in both cases (0.8 g/m$^3$) but slightly greater than that usually employed so as to try to increase the settling velocities UD. In the first series, 100% of the polyelectrolye was injected into the flocculation reactor B, near its propeller 10, while in the second series of trials only 50% of the polyelectrolyte was injected near the flocculation propeller 10 and 50% injected into the sludge-recirculation circuit 16. Moreover, the pilot plant was set and adjusted so that all the other trial conditions were identical.

The most significant results are summarized in the table below.

TABLE

| Raw water | Trial No.1 River water | Trial No.2 River water |
| --- | --- | --- |
| Coagulant (g/m$^3$) | 20 | 20 |
| Polyelectrolyte (g/m$^3$) | 0.8 (near the propeller 10) | 0.4 (near the propeller 10) 0.4 (in the recirculation 16) |
| Limiting mass flux Fml (kg/m$^2$/h) | 50 | 100 |
| Concentration CR in reactor B (g/l) | 1 50 | 1 100 |
| Limiting velocity Udl (m/h) Velocity tested in the pilot plant | | |
| UD (m/h) | 25 | 50 |
| UL (m/h) | 40 | 80 |
| Treated-water turbidity (NTU) | 0.5 to 1 | 0.7 to 1.1 |
| Filterability (s) | 60 | 30 |
| Extracted-sludge concentration (g/l) | 30 | 45 |

As may be apparent from studying the results given in this table, the process which forms the subject of the invention provides the following advantages over the prior state of the art:

1) for the identical dose of polymer, the mass flux is twice as high, thereby making it possible to test settling velocities UD, in the settling tank, or UL in the lamellar module, which are twice as high and for practically the same quality of treated water, this advantage translating into a reduction in the size of the apparatus;

2) the clarified water exhibits superior filterability. The filterability test time (30 seconds) is halved and is equivalent to that obtained with the usual doses of polymer (approximately 0.4 g/m$^3$) and lower treatment velocities (UD=15 m/h instead of 50 m/h.), this longer filtration cycle time leading to a reduction in the number of washings to be carried out on the filters;

3) the concentration of the extracted sludge is improved by approximately 50%, this result giving the advantage of allowing the size of the sludge-treatment systems to be reduced.

It should be emphasized that in some cases, when the adhesion of the coagulation microflocks to the dense recirculation sludge is poor, it is possible, according to the invention, to provide a third polymer injection point. In this case, this third injection point is preferably placed in the transfer pipe 12 which links the coagulator A with the flocculator B, or in a specific reactor inserted between the coagulator and the flocculator.

Figure 3:
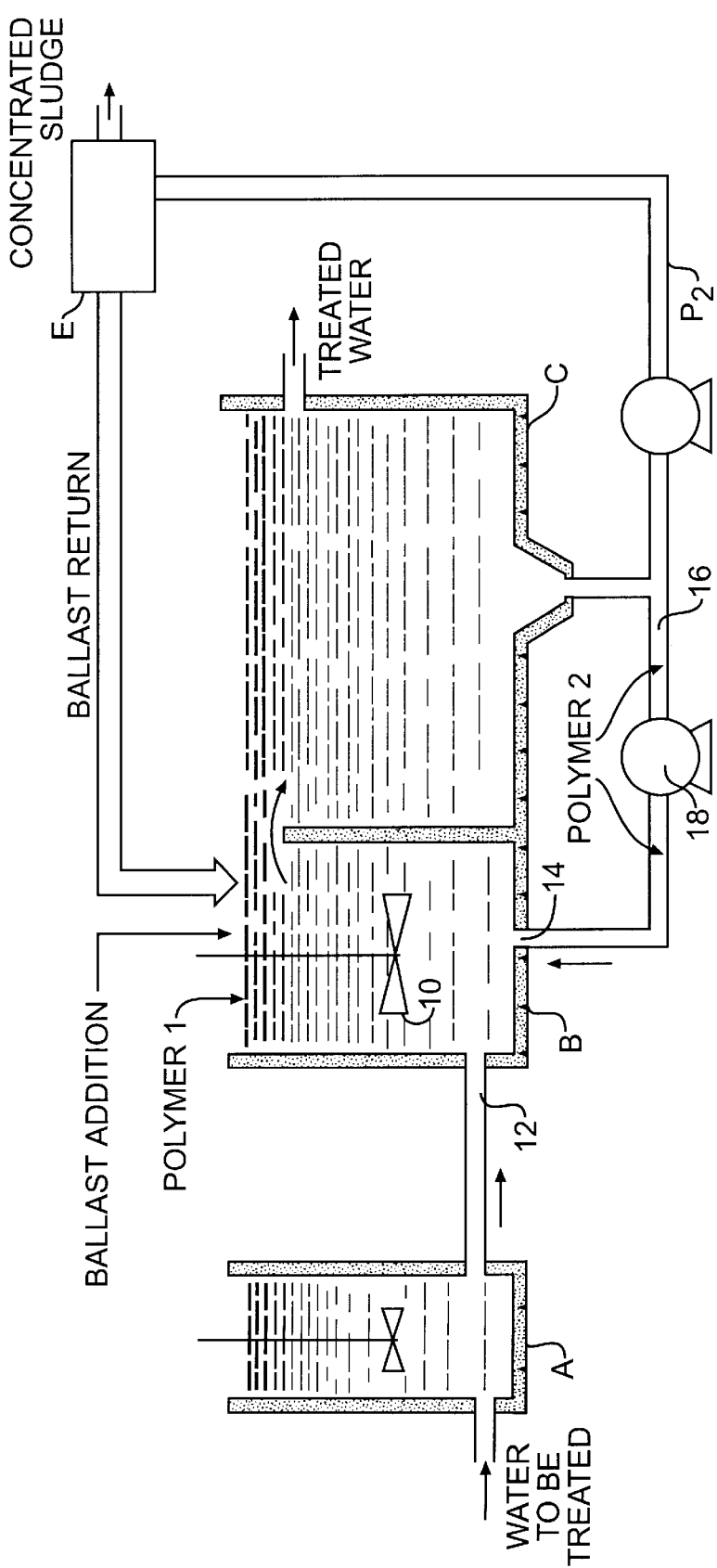
FIG. 3 illustrates the second aspect of the invention, combining double polyelectrolyte injection and ballast addition.

In the implementation example illustrated in FIG. 3, there is an addition of ballast to the flocculator B.

In this second aspect of the invention, depending on the level of purge of the densified sludge removed at P$_2$ and the cost of the ballast, the excess sludge may be either purely and simply discharged, or treated in order to recover the ballast. However, it will be noted that the sludge treatment, for recovering the sand, is different from that of the ballast-induced flocculation (FR-P-1,411,792 and FR-A-2,627,704). This is because, according to the invention, the sand is recovered without being cleaned, i.e. without regeneration, and the treatment is performed on concentrated sludge since it is not necessary to clean the sand thoroughly in the separation phase.

Shown diagrammatically at E in FIG. 3 are the means provided according to the invention for recovering the ballast. It will be noted that the low volume of sludge to be extracted, 0.1% to 1% of the water volume treated (i.e. from 5 to 50 times less than in the case of flocculation with ballast), makes it possible, optionally, to use separation techniques which are more sophisticated and have a higher performance, among which may be mentioned, in particular:

separation by hydrocyclone,
separation by blowing air,
separation by elutriation,
separation by centrifuging,
separation by ultrasound, or to reduce the energy cost of this separation station.

Given that the ballast merely has a simple ladening role and does not have the function of a contacting mass, the size of the particles of this ladening ballast, contrary to the case of ballast-induced flocculation, may advantageously be chosen towards larger diameters. Thus, it is possible to use weighting particles having a diameter of between 50 and 500 $\mu$m and preferably between 150 and 300 $\mu$m, while in the case of flocculation using a contacting mass consisting of a ballast, the particle size of the latter must be less than 150 $\mu$m and preferably between 50 and 100 $\mu$m.

This ballast diameter, in the process which forms the subject of the invention, constitutes a fundamental characteristic in order to:

increase the settling velocities (if d=100 $\mu$m, the ballast settling velocity=30 m/h, while if d=250 $\mu$m, the ballast settling velocity=115 m/h); recover the ballast from the extracted sludge.

It will be noted that, in some cases, if the ballast diameter is large enough, simple gravity separation, inside or outside the settling tank, may be envisaged in order to be able to recover and recycle the ballast.

The process according to the invention, with flocculation using a contacting mass consisting of recirculated densified sludge, has in particular the following advantages:

1. It provides a very high percentage of spatial occupation of the binding material, hence the treatment is highly effective:

stability of the purification performance characteristics, even when significantly increasing the charge of raw water;

capability of thorough removal of so-called "sensitive" pollutants (micro-particles, micro-organisms, traces of complex organic compounds, pesticides, helminth eggs, etc.).

2. The ballast only has a ladening function. Its average particle size may therefore be greater than that required for ballast-induced flocculation (e.g. 250 $\mu$m as opposed to 100 $\mu$m). This possibility has two advantages:

the settling velocities are considerably increased, this being the more so as the diameter of the ladening material is greater;

recovery of the ballast is all the more easy as its diameter is greater.

In some cases, if its diameter is sufficiently large, it is possible to envisage a simple gravity separation inside or outside the settling tank.

3. The recovered ballast does not need to be cleaned since it is not desired to regenerate "clean" sites for the coagulation/flocculation. Consequently, it is possible, and advantageous, to recover the ballast from highly concentrated sludge, which possibility has the following advantages:

since the extracted sludge is roughly 10 times more concentrated, the volume of the thickener/storage unit installed downstream of the settling tank may be proportionately reduced;

the sand-recovery system operates on smaller volumes in the same proportions (e.g. 10 times smaller) and, here too, the size of the equipment and the energy consumption may be reduced.

4. Separating the flocculation sludge-mass/ballast functions makes it possible to envisage operating with a low throughput (between less than 20% and 80% of Qmax, depending on the case) without adding or recirculating the ballast, thereby making it possible to reduce the running costs even further.

5. The sludge densification, achieved by the combination of double polymer injection and ballast addition, makes it possible to produce high-velocity settling equipment having spectacular advantages over the known plants.

The variant according to the invention which consists in combining injection, into the sludge-recirculation circuit, of at least part of the polyelectrolyte ensuring flocculation and the addition of ballast into the flocculator is mainly used in the case of the production of a flock which is difficult to densify by the polymer alone or, above all, in the case of an excess throughput for the plant.

What is claimed is:

1. A physico-chemical process for treating effluent comprising the steps:

subjecting the effluent to coagulation that forms microflocs;

adding polyelectrolyte to the coagulated effluent to produce flocculation causing agglomeration of the microflocs into flocs;

subjecting the resulting flocculated effluent to settling for separating flocs and interstitial water components thereby forming densified sludge and clarified water;

recycling a portion of the sludge to the flocculated effluent during the step of flocculation, the recycled sludge serving as a contact mass for the flocs;

at least a portion of the polyelectrolyte added during flocculation being injected into the densified sludge prior to being recycled to the flocculated effluent during flocculation.

2. Process according to claim 1, wherein the percentage of polyelectrolyte injected into the recycled sludge varies from 20 to 70% of the total amount of polyelectrolyte injected during the flocculation step and into the recycled sludge.

3. Process according to claim 1, wherein the polyelectrolyte injected into the recycled sludge is different from the polyelectrolyte which is injected into the flocculation step.

4. Process according to claim 3 wherein the polyelectrolyte injected into the flocculation step is an anionic polymer, and the polyelectrolyte injected into the recycled sludge is a cationic polymer.

5. Process according to claim 1 wherein a primary injection of polyelectrolyte is carried out near a flocculation propeller.

6. Process according to claim 1 wherein a direct injection of polyelectrolyte is carried out between the coagulation step and the flocculation step.

7. Process according to claim 1, wherein the polyelectrolyte injected into the recycled sludge occurs in a pipe provided for recirculating the recycled sludge into the flocculation step, downstream and/or upstream of means which are provided for recirculating sludge.

8. Process according to claim 1 wherein the polyelectrolyte into the recycled sludge occurs in a recirculated sludge/polymer mixing reactor which is inserted into a pipe for recirculating the recycled sludge.

9. Process according to claim 1, wherein a third polyelectrolyte injection point is provided.

10. Process according to claim 9, wherein said third injection point is positioned, upstream of a direct injection of polyelectrolyte, in a pipe which is provided for transferring the effluent between the coagulation step and the flocculation step.

11. Process according to claim 9, wherein said third polyelectrolyte injection point is positioned in a specific reactor which is interposed between the coagulation step and the flocculation step.

12. Process according to claim 1, wherein the recycled sludge is injected directly into the flocculation step.

13. Process according to claim 1 wherein the recycled sludge is injected into a pipe provided for connecting the coagulation step to the flocculation step.

14. Process according to claim 1, wherein in the volume of densified sludge constituting the contacting mass, which is continuously recirculated, after settling and thickening, to the flocculation step, is between 0.5 and 4% of the effluent volume treated.

15. Process according to claim 1, wherein that part of the excess, densified sludge which is not recycled in the flocculation step and is extracted in the settling step, represents a purge volume of about 0.1 to 1% of the volume of water treated.

16. Process according to claim 15, wherein the excess, densified sludge, which is not recycled, is discharged without treatment.

17. Process according to claim 15, wherein the excess, densified sludge, which is not recycled, is treated so as to recover ballast having sludge partially removed.

18. Process according to claim 15, wherein the ballast is recovered by gravity sedimentation, either inside or outside the settling tank, the recovered ballast then being recycled in the flocculation step.

19. A physico-chemical process for treating effluent comprising the steps:

subjecting the effluent to coagulation that forms microflocs;

adding polyelectrolyte to the coagulated effluent to produce flocculation causing agglomeration of the microflocs into flocs;

subjecting the resulting flocculated effluent to settling for separating flocs and interstitial water components thereby forming densified sludge and clarified water;

continuously recycling a portion of the sludge to the flocculated effluent during the step of flocculation, the recycled sludge serving as a contact mass for the flocs;

introducing ballast into the recycled sludge for making the recycled sludge heavier, the recycled sludge, containing ballast, remaining in the process without subsequent removal of the ballast from the sludge;

at least a portion of the polyelectrolyte added during flocculation being injected into the densified sludge prior to being recycled to the flocculated effluent during flocculation.

20. Process according to claim 19, wherein the percentage of polyelectrolyte injected into the recycled sludge varies from 20 to 70% of the total amount of polyelectrolyte injected during the flocculation step and into the recycled sludge.

21. Process according to claim 19, wherein the polyelectrolyte injected into the recycled sludge is different from the polymer which is injected into the flocculation step.

22. Process according to claim 21, wherein the polyelectrolyte injected into the flocculation step is an anionic polymer, and the polyelectrolyte injected into the recycled sludge is a cationic polymer.

23. Process according to claim 19, wherein a direct injection of polyelectrolyte occurs near a flocculation propeller.

24. Process according to claim 19 wherein a direct injection of polyelectrolyte is carried out between the coagulation step and the flocculation step.

25. Process according to claim 19 wherein the polyelectrolyte injected into the recycled sludge occurs in a pipe provided for recirculating the recycled sludge into the flocculation step downstream and/or upstream of means which are provided for recirculating sludge.

26. Process according to claim 19, wherein the polyelectrolyte injected into the recycled sludge occurs in a recirculated sludge/polymer mixing reactor which is inserted into a pipe for recirculating the recycled sludge.

27. Process according to claim 19, wherein a third polyelectrolyte injection point is provided.

28. Process according to claim 27, wherein said third injection point is positioned, upstream of a direct injection of polyelectrolyte, in a pipe which is provided for transferring the effluent between the coagulation step and the flocculation step.

29. Process according to claim 27, wherein that third polyelectrolyte injection point is positioned in a specific reactor which is interposed between the coagulation step and the flocculation step.

30. Process according to claim 19, wherein the recycled sludge is injected directly into the flocculation step.

31. Process according to claim 19, wherein the recycled sludge is injected into a pipe provided for connecting the coagulation step to the flocculation step.

32. Process according to claim 19, wherein said ballast consists of a material having a particle size of between 50 to 500 $\mu$m.

33. Process according to claim 32 wherein said ballast is a dense inorganic material, having an actual particle density between 2 and 8 g/ml.

34. Process according to claim 19, wherein the volume of densified sludge constituting the contacting mass, which is continuously recirculated, after settling and thickening, to the flocculation step, is between 0.5 and 4% of the effluent volume treated.

35. Process according to claim 19, wherein that part of the excess, densified sludge which is not recycled in the flocculation step and is extracted in the settling step, represents a purge volume of about 0.1 to 1% of the volume of water treated.

36. Process according to claim 35, wherein the excess, densified sludge, which is not recycled, is discharged without treatment.

37. Process according to claim 35, wherein the excess, densified sludge, which is not recycled, is treated so as to recover ballast having sludge partially removed.

38. Process according to claim 37, wherein the ballast is recovered by gravity sedimentation, either inside or outside the settling tank, the recovered ballast then being recycled in the flocculation step.

* * * * *